US012640824B2

(12) United States Patent
Kim et al.

(10) Patent No.: US 12,640,824 B2
(45) Date of Patent: May 26, 2026

(54) METHOD OF DETERMINING DEVICE LOCATION AND ELECTRONIC DEVICE PERFORMING THE METHOD

(71) Applicant: SAMSUNG ELECTRONICS CO., LTD., Suwon-si (KR)

(72) Inventors: Dowan Kim, Suwon-si (KR); Junsuk Kim, Suwon-si (KR); Hyuncheol Park, Suwon-si (KR); Gyeongmin Pyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 511 days.

(21) Appl. No.: 18/187,974

(22) Filed: Mar. 22, 2023

(65) Prior Publication Data

US 2023/0224053 A1 Jul. 13, 2023

Related U.S. Application Data

(63) Continuation of application No. PCT/KR2022/017673, filed on Nov. 11, 2022.

(30) Foreign Application Priority Data

Nov. 11, 2021 (KR) ........................ 10-2021-0154497
Jan. 3, 2022 (KR) ........................ 10-2022-0000380

(51) Int. Cl.
H04B 17/27 (2015.01)
H04B 17/26 (2015.01)
H04W 64/00 (2009.01)

(52) U.S. Cl.
CPC ............. H04B 17/27 (2015.01); H04B 17/26 (2015.01); H04W 64/003 (2013.01)

(58) Field of Classification Search
CPC ..... H04B 17/27; H04B 17/26; H04W 64/003; H04W 4/029; H04W 4/70; H04W 88/02; G01S 5/0264; G01S 5/02521
See application file for complete search history.

(56) References Cited

U.S. PATENT DOCUMENTS 9,936,356 B2 4/2018 Jeong et al.
10,681,141 B2 6/2020 Ledvina et al.
(Continued)

FOREIGN PATENT DOCUMENTS

KR 10-2017-0132263 12/2017
KR 10-2019-0106297 9/2019
(Continued)

OTHER PUBLICATIONS

International Search Report for PCT/KR2022/017673 mailed Feb. 20, 2023, 3 pages.

*Primary Examiner* — Umair Ahsan
(74) *Attorney, Agent, or Firm* — NIXON & VANDERHYE P.C.

(57) ABSTRACT

Provided are a method of determining a location of a device and/or an electronic device for performing the method. An electronic device according to various example embodiments may include a processor, a communication module which may communicate with a device stored in a memory, wherein the memory which is electronically connected to the processor and stores the device and an instruction to be executed by the processor, and the memory, when operated by the processor, may identify a location of the electronic device in a plurality of areas where the device may be located, determine a candidate location of the device in the plurality of areas based on a signal received from the device and the location of the electronic device, collect a control history of the device using the communication module, and (Continued)

determine the location of the device among the candidate locations based on the control history and the location of the electronic device.

14 Claims, 8 Drawing Sheets

(56)                    References Cited

U.S. PATENT DOCUMENTS

| | | | |
|---|---|---|---|
| 10,775,961 B2 | 9/2020 | Ogawa et al. | |
| 2020/0084574 A1* | 3/2020 | Kwon | H04W 4/021 |
| 2020/0412862 A1* | 12/2020 | Oh | H04W 76/14 |

FOREIGN PATENT DOCUMENTS

| | | |
|---|---|---|
| KR | 10-2019-0133839 | 12/2019 |
| KR | 10-2071473 | 1/2020 |
| KR | 10-2021-0052881 | 5/2021 |
| KR | 10-2021-0097469 | 8/2021 |
| KR | 10-2021-0102032 | 8/2021 |
| KR | 10-2021-0121910 | 10/2021 |

* cited by examiner

320

320

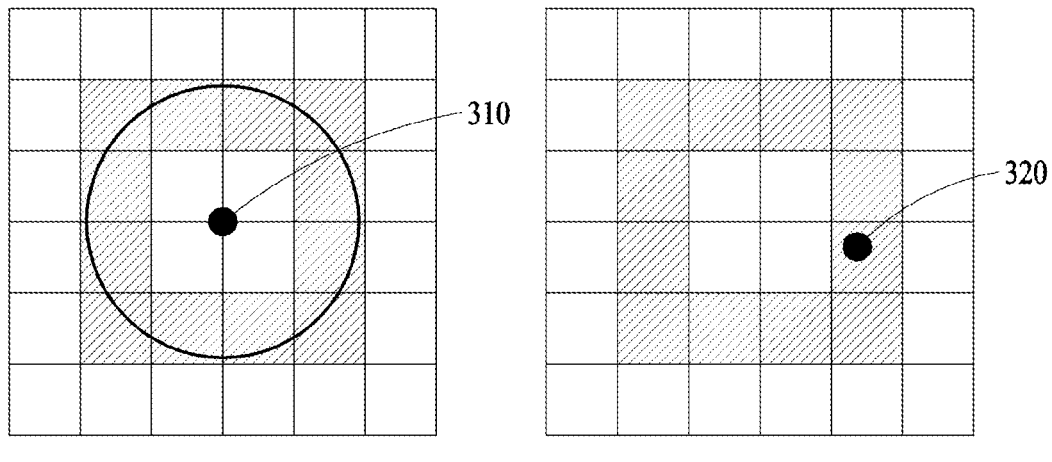
FIG. 8A                    FIG. 8B

METHOD OF DETERMINING DEVICE LOCATION AND ELECTRONIC DEVICE PERFORMING THE METHOD

CROSS-REFERENCE TO RELATED APPLICATIONS

This application is a national stage application of International Application No. PCT/KR2022/017673 designating the United States, filed on Nov. 11, 2022, in the Korean Intellectual Property Receiving Office and claiming priority from Korean Patent Application No. 10-2021-0154497 filed on Nov. 11, 2021, and Application No. 10-2022-0000380 filed on Jan. 3, 2022, in the Korean Intellectual Property Office, the disclosures of which are incorporated by reference herein in their entireties.

BACKGROUND

1. Field

The disclosure relates to a method of determining a device location and/or an electronic device for performing the method.

2. Description of Related Art

An Internet of things (IoT) platform is a system which collects and exchanges information by connecting all devices such as mobile devices and home appliances by communication. A user may use a smart device to control the device registered in the IoT platform, and expect a certain level of automation which interacts according to the user's behavior.

In order to efficiently use the IoT platform, locations of IoT devices registered in the platform may be set.

SUMMARY

A location of a device may be set when registering the device in an Internet of things (IoT) platform. When changing the location of the device from an initial location set during a first registration in the IoT platform, a user should directly reset the location of the device.

If the location of the device is not reset after the location is changed, automation rules set related to an operation of the device in the IoT platform may malfunction.

According to various example embodiments, a candidate location of a device may be determined using signals collected from a device registered in an IoT platform, and a method configured to determine a location of the device using a control history of the device and an electronic device configured to perform the method may be provided.

According to various example embodiments, a method for determining a location of the device and an electronic device configured to perform the method may be provided, wherein the method determines the location of the device using an offline control history of the device and a user location at the time of device control, in the control history of the device.

An electronic device according to various example embodiments may include a processor, a communication module, comprising communication circuitry, which may communicate with a device registered in a memory, and the memory, which is electronically connected (directly or indirectly) to the processor and stores the device and an instruction to be executed by the processor; and the processor is configured, when the instruction is executed/operated, to identify a location of the electronic device in a plurality of areas where the device may be located. The processor may determine a candidate location of the device in the plurality of areas based on a signal received from the device and the location of the electronic device. The processor may collect a control history of the device using the communication module. The processor may determine the location of the device among the candidate locations based on the control history and the location of the electronic device.

An electronic device according to various example embodiments may include a processor, a communication module which may communicate with a device registered in a memory, and the memory, which is electronically connected to the processor and stores the device and an instruction executed by the processor; and the processor, when the instruction is operated, may identify a location of the electronic device in a plurality of areas where the device may be located. The processor may determine a candidate location of the device in the plurality of areas based on a signal received from the device and the location of the electronic device. The processor may collect a control history of the device using the communication module. The processor may identify an offline control history in which direct control signal is input in the device, among the control history of the device. The processor may determine the location of the device by comparing the location of the electronic device of the time when the offline control history is generated and the candidate location.

A method of determining locations of the device according to various example embodiments may include identifying a location of an electronic device in a plurality of areas where the device may be stored in a memory may be located, collecting a signal transmitted from the device to the electronic device, determining candidate locations of the device in the plurality of areas based on the location of the electronic device and the signal, and determining the location of the device from the candidate locations by collecting a control history of the device, and based on the control history and the location of the electronic device.

According to various example embodiments, a method of determining a location of a device and an electronic device performing the method may determine the location of the device using a signal collected from the device registered in an Internet of things (IoT) platform, location of the electronic device, and device control history.

According to various example embodiments, a method of determining a location of a device and an electronic device performing the method may enhance a reliability of the determined location of the device by determining a candidate location of the device using signals collected from the device, and by determining the location of the device by comparing the candidate location of the device and a location of the electronic device at a time of an offline control history of the device.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 8A and 8B are diagrams illustrating a determination of a candidate location of a device and a location of the device by an electronic device according to various example embodiments.

DETAILED DESCRIPTION

Figure 1:
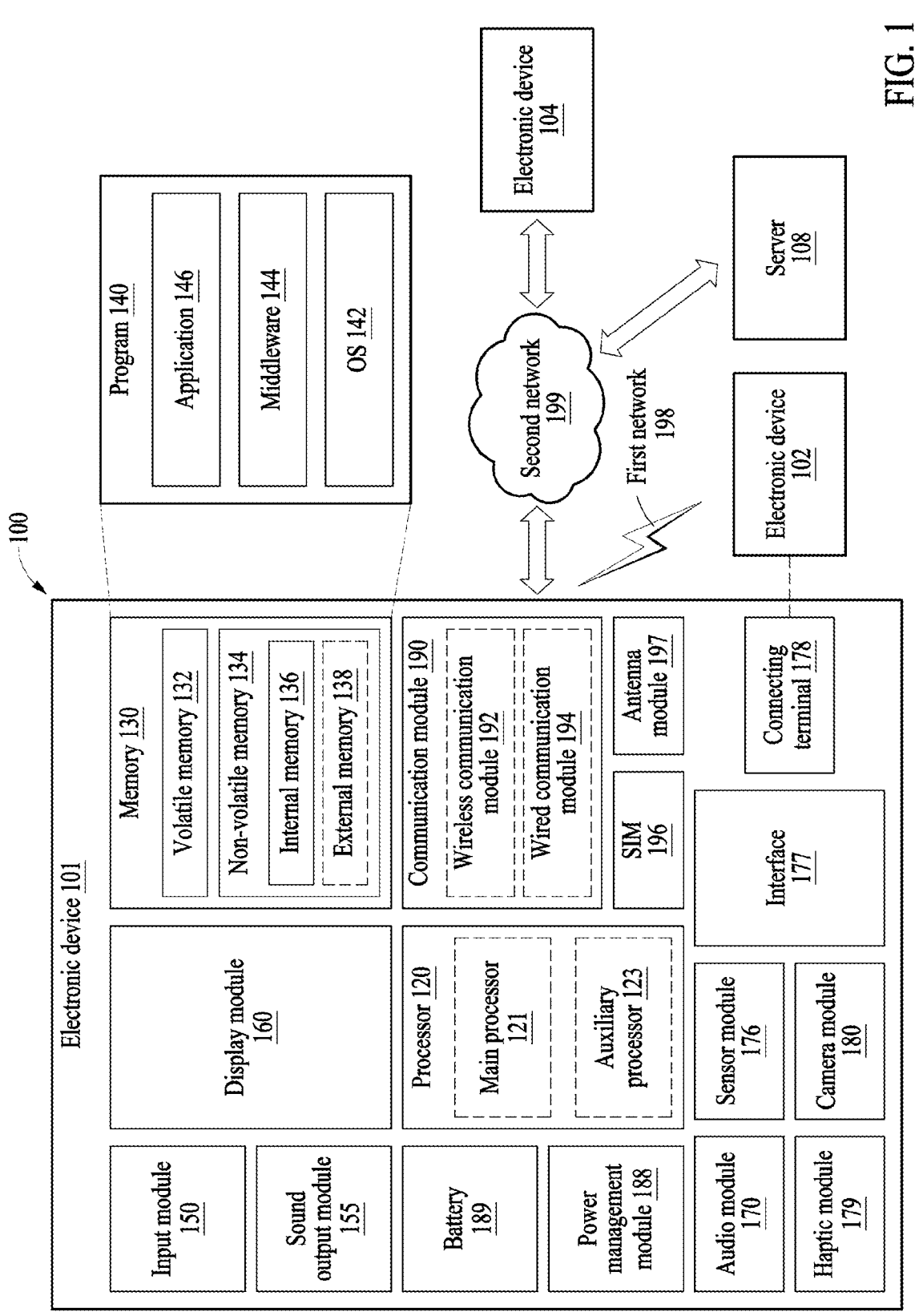
FIG. 1 is a block diagram illustrating an example electronic device in a network environment according to various example embodiments.

Hereinafter, various example embodiments will be described in greater detail with reference to the accompanying drawings. When describing the example embodiments with reference to the accompanying drawings, like reference numerals refer to like elements and a repeated description related thereto have been omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected (directly or indirectly) to the processor 120, and may perform various data processing or computations. According to an example embodiment, as at least a part of the data processing or computations, the processor 120 may store a command or data received from another components (e.g., the sensor module 176 or the communication module 190) in a volatile memory 132, process the command or the data stored in the volatile memory 132, and store resulting data in a non-volatile memory 134 (which may include internal memory 136 and/or external memory 138). According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to specialize in a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure for artificial intelligence model processing. The artificial intelligence model may be generated by machine learning. Such learning may be performed by, for example, the electronic device 101 in which artificial intelligence is performed, or by a separate server (e.g., the server 108). Learning algorithms may include, but are not limited to, for example, supervised learning, unsupervised learning, semi-supervised learning, or reinforced learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound from the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or a data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled (directly or indirectly) with the external electronic device (e.g., the electronic device 102) directly (e.g., in a wired manner) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector by which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user by tactile sensation or kinesthetic sensation. According to an example embodiment, the haptic module 179 may include, for example, a motor, a piezoelectric element, or an electric stimulator.

The camera module 180 may capture still images and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi-components (e.g., multi-chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled (directly or indirectly) with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
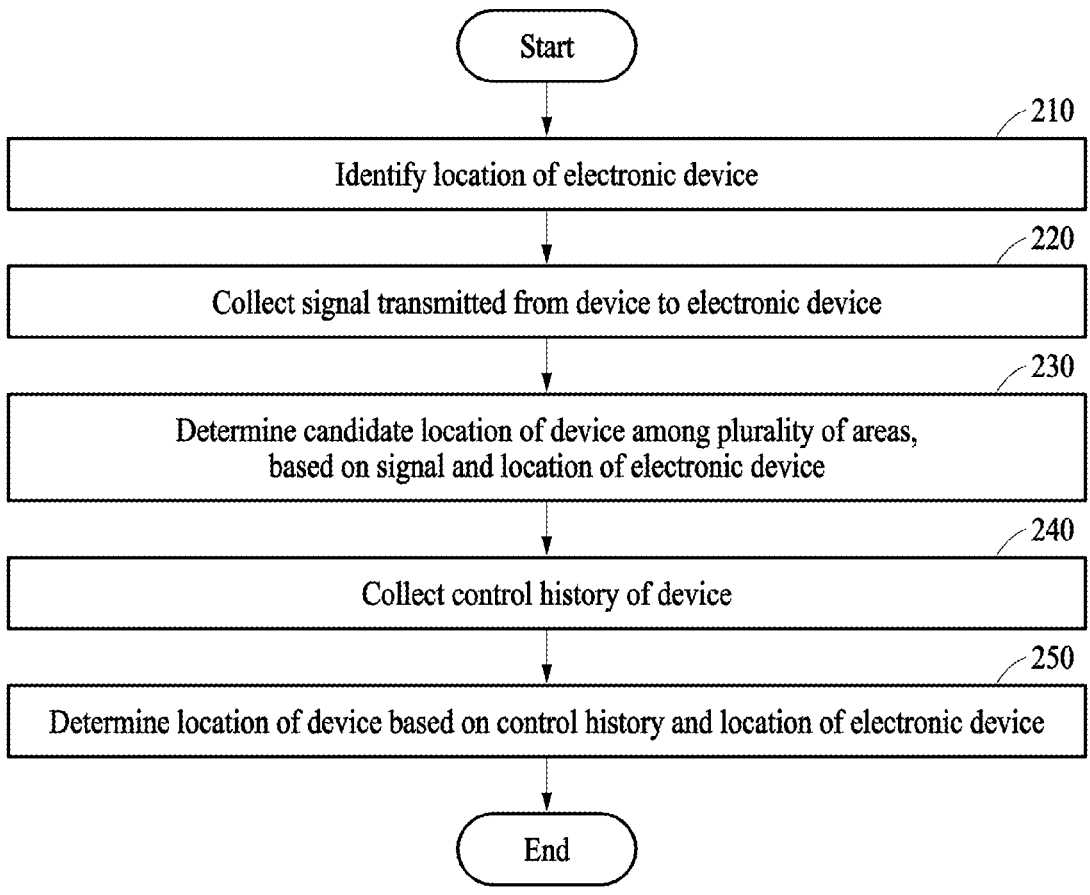
FIG. 2 is a diagram illustrating a determination of a location of a device by an electronic device according to various example embodiments.

FIG. 2 is a diagram illustrating a determination of a location of a device (e.g., the electronic device 102 of FIG. 1) by an electronic device (e.g., the electronic device 101 of FIG. 1) according to various example embodiments.

Referring to FIG. 2, an electronic device according to various example embodiments may determine the location of a device stored in a memory (e.g., the memory 130 of FIG. 1). For example, the electronic device may determine a candidate location of the device using a signal received from the device. For example, the electronic device may determine the location of the device among candidate locations based on the control history of the device and the location of the electronic device.

An electronic device according to various example embodiments may identify the location of the electronic device in operation 210. For example, the electronic device may communicate with the device stored in the memory by using a communication module (e.g., the communication module 190 of FIG. 1). For example, the electronic device may store the device in the memory. For example, when the electronic device stores the device in the memory, it may indicate that the electronic device stores information of the electronic device for communicating with the device through a first network (e.g., a first network 198 of FIG. 1) and/or a second network (e.g., a second network 199 of FIG. 1).

For example, the electronic device may identify a plurality of areas where the device stored in the memory may be located. For example, the electronic device may identify the location of the electronic device using methods such as a method using a radio frequency (RF) signal including Wi-Fi, BLE, and UWB (e.g., fingerprinting method); a method using an external camera and/or a motion sensor (e.g., surveillance method); and a method using a camera (e.g., the camera module 180 of FIG. 1) of the electronic device (e.g., SLAM, VIO). For example, the electronic device may identify the plurality of areas by using the location of the electronic device determined according to a movement of the user.

The electronic device according to various example embodiments may label each of the plurality of areas. For example, the electronic device may label each of the plurality of areas by using at least one method among methods using an RF signal, external camera and/or motion sensor, and a camera of the electronic device. For example, the electronic device may label the areas according to a purpose of each area. For example, the electronic device may label each area, including context information. For example, the electronic device may label the area according to the purpose of the area, for example as a living room, a master bedroom, a kitchen, and a bathroom.

For example, the electronic device may identify an area where the electronic device is located among a plurality of areas. For example, if the electronic device is located in the living room, the electronic device may be identified as located in the living room area.

For example, the electronic device may identify information (e.g., an indoor map, a drawing of a design) representing the plurality of areas as an image, and may identify the location of the electronic device from the information represented as the image as a coordinate. For example, in a two-dimensional area with a length of 20 m and a width of 10 m, if the location of the electronic device at 5 m of the length and 5 m of the width, the electronic device may identify the coordinate of the electronic device as (5,5).

As another example, the electronic device may identify and thereby make an image of the plurality of areas. The electronic device may identify the location of the electronic device as a coordinate in the plurality of imaged areas.

The electronic device according to various example embodiments may collect the signal transmitted from the device to the electronic device in operation 220. For example, the electronic device may collect a Wi-Fi signal and/or a BLE signal from the device.

For example, the electronic device may periodically collect the signal transmitted from the device. The electronic device may use the signal periodically transmitted from the device to determine the location of the device, as described below. The electronic device may determine the location of the device even if the location of the device is changed and the user does not perform a separate registration operation and location setting, by determining the location of the device using the signal periodically transmitted from the device.

The electronic device according to various example embodiments may determine the candidate location of the device in the plurality of areas based on the signal and the location of the electronic device in operation 230. For example, the electronic device may determine the candidate location by using the strength of the signal collected from the device and the location of the electronic device at the point of collecting the signal.

For example, the electronic device may determine the candidate location as an area closer to the area of the electronic device among the plurality of areas, as the strength of the signal collected from the device becomes stronger. The strength of the signal transmitted from the device to the electronic device, may become weaker as the distance of transmission becomes longer.

For example, a first signal stronger than a second signal and transmitted from the device to the electronic device may indicate that the device which transmitted the first signal is located in a closer area to the electronic device than the device which transmitted the second signal.

For example, the electronic device may convert the strength of the signal to a distance value, using a received strength of the signal index (RSSI) value of the signal collected from the device. For example, the electronic device may convert the strength of the signal into a distance value by using the RSSI value of the signal received from the device, according to various signal attenuation models. For example, the strength of the signal may be converted to a distance value using the RSSI value according to a path loss transmission model.

For example, the electronic device may receive a Wi-Fi or BLE signal from the device, and may convert the strength of the signal to a distance value by applying different signal attenuation models to the Wi-Fi signal and BLE signal. The electronic device may convert the strength of the signal by applying various known signal attenuation models.

For example, the electronic device may convert the strength of the signal received from the device as a distance value, and determine the areas located in the distance value converted from the location of the electronic device as the candidate location of the device.

As another example, the electronic device may determine the candidate location of the device as an area corresponding to the location of the electronic device, if the strength of the RSSI value of the signal collected from the device is within a set range. For example, if the strength of the signal received by the electronic device from the device is very strong, it may indicate that the device is located in the same area as the electronic device. If the RSSI value is very large, the electronic device may set a range of the RSSI value; for example, greater than or equal to −30 dBm and less than or equal to −40 dBm. If the strength of the signal received from the device is within the set range (e.g., −35 dBm), the electronic device may determine the candidate location of the device as an area corresponding to the location of the electronic device.

The electronic device according to various example embodiments may collect the control history of the device in operation 240. For example, the electronic device may collect the control history of the device using a communication module. For example, the electronic device may collect the control history by collecting the control history of the device from the device, or by using the control signal transmitted from the communication module of the electronic device to the device.

For example, the electronic device may collect a control history of the device from the IoT platform. For example, the IoT platform may refer to a device or program for managing and controlling the device stored in the memory of the electronic device.

For example, the electronic device may register, control, and manage the device by executing an application (e.g., the application 146 of FIG. 1) stored in the memory, and the executed application may indicate an IoT platform. As another example, the IoT platform may be an external electronic device which may be connected (directly or indirectly) with the device and the electronic device by communication. The electronic device may register, control, and manage the device which may be connected (directly or indirectly) with the external electronic device by communication, by the external electronic device.

For example, the electronic device may collect a control history of the device from the IoT platform. For example, the electronic device may execute an application stored in the memory, and use the executed application to collect the control history of the registered device. As another example, the electronic device may be connected (directly or indirectly) to the external electronic device for controlling and managing the device by communication, and collect the control history of the device from the external electronic device. For example, the electronic device may identify information such as the state, control history, and type of the device. For example, the electronic device may store information such as the state, control history, and type of the device in the memory. For example, the electronic device may collect information such as the state, control history, and type of the device from the device, using the communication module, and save them. For example, the electronic device may execute an application, for example, an application for registering, controlling, and managing the device, using an IoT platform, or collect information such as the state, control history, and type of the device and store it in the memory by using an external electronic device which is capable of communicating with the electronic device and the device.

For example, the control history of the device collected by the electronic device may include information about the control method of the device, such as whether the device was controlled offline or online.

For example, offline control of the device may indicate a user directly controlling the device through means capable of directly receiving an input from the user, such as an input module included in the device. For example, online control of the device may indicate transmitting a control signal input by the user in an apparatus other than the device to the device, like the electronic device transmits the control signal to the device through a communication module, and the device changing operation, state, and others according to the strength of the received control signal.

For example, the electronic device may distinguish and identify an offline control history wherein the control signal is directly input to the device, and an online control history wherein the control signal is indirectly input to the device, among the received control history of the device.

In operation 250, the electronic device according to various example embodiments may determine the location of the device among the candidate locations of the device based on the control history and the location of the electronic device. For example, the electronic device may determine the location of the device by comparing the location of the electronic device at a time when the control history is generated and the candidate location of the device.

For example, the electronic device may determine the candidate location which is identical to the location of the electronic device of the time when the offline control history is generated as the location of the device, among the plurality of candidate locations. For example, since generation of an offline control history indicates that the user accessed the device, the location of the electronic device of the time when the offline control history is generated may be the actual location of the device. The electronic device may estimate the candidate location which is identical to the location of the electronic device of the time when the offline control history is generated as the actual location of the device, among the plurality of candidate locations.

By determining the candidate location, which is identical to the location of the electronic device at the time when the offline control history is generated, as the location of the device, the electronic device may determine the candidate location highly likely to correspond to the actual location of the device as the location of the device, among the plurality of candidate locations. The electronic device may determine the location of the device without separately setting the changed location of the device when the location of the device is changed, by determining the location of the device using the control history, the strength of the signal received from the device, and the location of the electronic device.

Each embodiment herein may be used in combination with any other embodiment herein.

Figure 3:
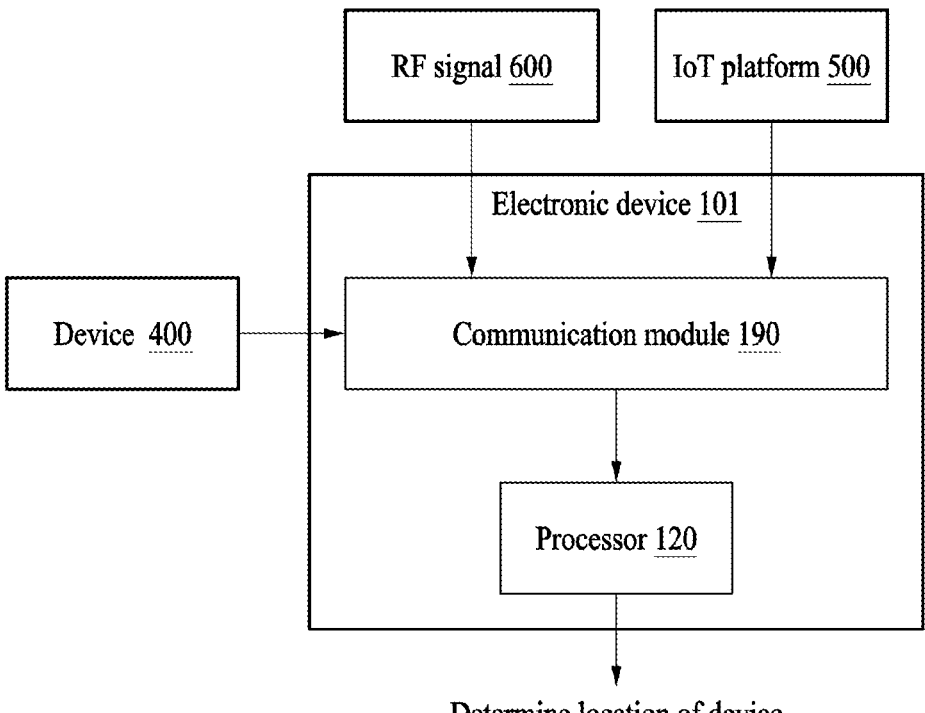
FIG. 3 is a schematic block diagram illustrating an electronic device according to various example embodiments.

FIG. 3 is a schematic block diagram of the electronic device 101 according to various example embodiments.

Referring to FIG. 3, the electronic device 101 according to various example embodiments may include the communication module 190 and the processor 120. The electronic device 101 may receive an RF signal 600 (e.g., Wi-Fi, BLE, and UWB). By using the communication module 190 (comprising communication circuitry), the electronic device 101 may communicate with a device 400 (e.g., the electronic device 102 of FIG. 1) and/or an IoT platform 500 through the first network (e.g., the first network 198 of FIG. 1) and/or the second network (e.g., the second network 199 of FIG. 1).

Referring to FIG. 3, the electronic device 101 according to various example embodiments may receive the RF signal 600 through the communication module 190. The processor 120 may identify the location of the electronic device 101 by using the RF signal 600 received from the communication module 190. An example in which the electronic device 101 shown in FIG. 3 identifies the location of the electronic device 101 using the RF signal 600 corresponds to an example embodiment among various example embodiments, and the electronic device is a different example embodiment from the example embodiment shown in FIG. 3; it may identify the location of the electronic device 101 by using an external camera and/or motion sensor, or by using the camera of the electronic device 101 (e.g., the camera module 180 of FIG. 1).

Referring to FIG. 3, the electronic device 101 according to various example embodiments may communicate with the device 400 and the IoT platform 500 through the communication module 190. The electronic device 101 may receive a signal from the device 400 through the communication module 190 and receive the control history of the device from the IoT platform 500. For example, the signal received from the device 400 may be a Wi-Fi or BLE signal.

The processor 120 (comprising processing circuitry) of the electronic device 101 according to various example embodiments may determine the candidate location of the device 400 by using a signal received from the device 400 and location of the electronic device 101. For example, the processor 120 may convert the strength of the signal received from the device 400 into a distance value, and may determine an area which is away from the location of the electronic device 101 by the distance value as the candidate location of the device 400.

The processor 120 of the electronic device 101 according to various example embodiments may determine the location of the device 400 based on the location of the electronic device 101, the control history of the device, and the candidate location of the device. For example, the processor 120 may identify an offline control history among the control history of the device. The processor 120 may compare the location of the electronic device 101 at the time when the offline control history is generated and the candidate location. The processor 120 may determine the candidate location which is identical to the location of the electronic device 101 at the time when the offline control history is generated as the location of the device 400, among the plurality of candidate locations.

In an example of FIG. 3, the IoT platform 500 can communicate with the device 400 and/or the electronic device 101. In FIG. 3, the IoT platform 500 may register a device registered in the memory 130 of the electronic device 101. For example, the electronic device may identify the state of the device or control or manage the device via the IoT platform 500.

In an example, the electronic device 101 may collect the control history of the device 400 from the device 400 through the communication module 190.

In an example, the IoT platform 500 may be an application (e.g., the application 146 of FIG. 1) stored in the memory 130 of the electronic device 101. The electronic device 101 may execute the IoT platform 500, receive information such as the state, control history, and type of the device using the IoT platform 500, and then store the information in the memory 130.

Figure 4A:
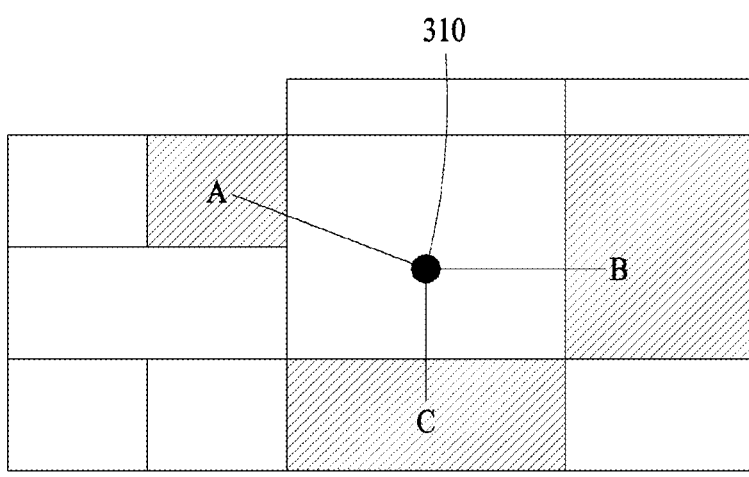
FIGS. 4A, 4B, and 4C are diagrams illustrating a determination of a candidate location of a device by an electronic device according to various example embodiments.
Figure 4B:
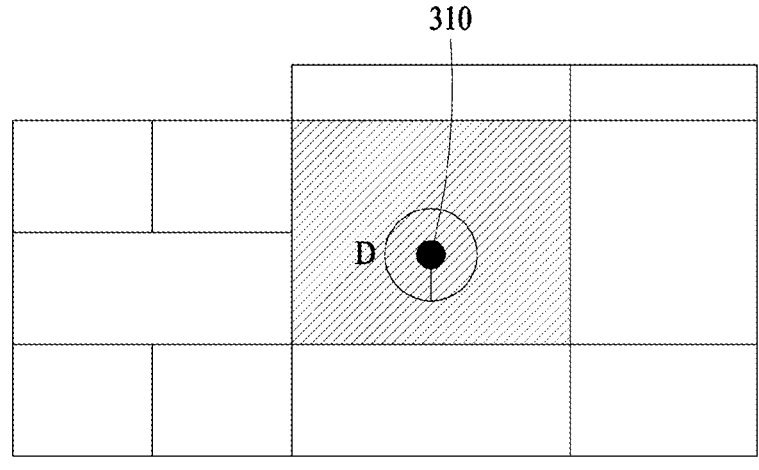
Figure 4C:
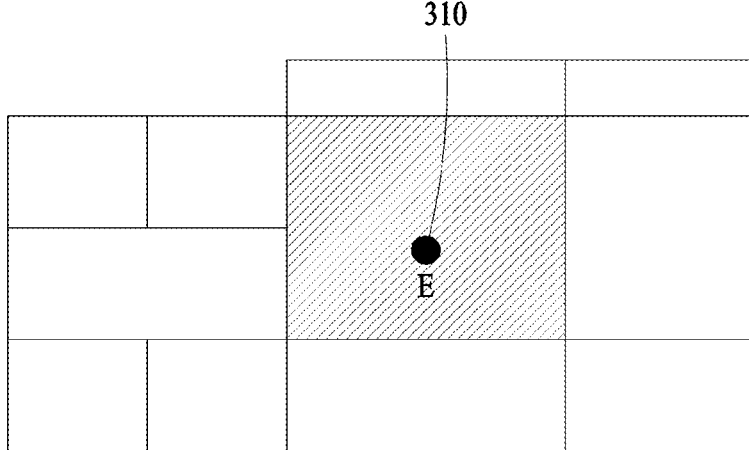

FIGS. 4A to 4C are diagrams illustrating the determination of a candidate location of the device (e.g., the device 400 of FIG. 3), by the electronic device (e.g., the electronic device 101 of FIG. 1) according to various example embodiments.

FIGS. 4A to 4 C are diagrams illustrating the determination of the candidate location according to the strength of the signal received from the device, by the electronic device according to various example embodiments.

Referring to FIG. 4A, the electronic device according to various example embodiments may convert the strength of the signal to a distance value by using the RSSI value, which is the strength of the signal. For example, the electronic device may convert the strength of a signal received from the device into a distance value according to a signal attenuation model. As the distance of the signal transmitted from the device increases, the RSSI value may decrease. For example, the electronic device may calculate the distance value by which the signal is transmitted, by using the path loss transmission model and by using the RSSI value of the signal transmitted from the device. For the signal attenuation model of the electronic device for converting the strength of the signal to the distance value, various models may be applied to calculate the distance value by which the signal is transmitted, according to the strength of the received signal.

For example, the electronic device may convert the signal to a distance value according to the strength of the signal, by applying different signal attenuation models depending on whether the signal received from the device is a Wi-Fi signal or a BLE signal.

In FIG. 4A, the electronic device may identify a location 310 of the electronic device. The electronic device may convert the strength of the signal received from the device into a distance value. The electronic device may determine an area A, an area B, and an area C in the plurality of areas of FIG. 4A as a candidate location of the device, according to the distance value from the location 310 of the electronic device. A straight line drawn from the location of the electronic device in FIG. 4A may indicate a distance value obtained by the electronic device by converting the strength of the signal.

FIG. 4B is a diagram illustrating a case in which the electronic device receives a strength of the signal greater than the signal received from the device in FIG. 4A. For example, as the strength of the received signal increases, the electronic device may determine an area closer to the location of the electronic device as the candidate location. In FIG. 4B, the electronic device may convert the strength of a signal received from the device into a distance value, and determine an area D as a candidate location according to the distance value from the location 310 of the electronic device.

FIG. 4C is a diagram illustrating the determination of the electronic device according to various example embodiments, of a candidate location when the strength of a signal received from the device is within a set range. For example, if the strength of the signal received from the device is within a set range, the electronic device may determine the location of the electronic device as the candidate location of the device. For example, in FIG. 4C, if the strength of the signal received by the electronic device is −40 dBm and the set range is −30 dBm or more and −50 dBm or less, the electronic device may determine an area E corresponding to the location of the electronic device as the candidate location.

Figure 5:
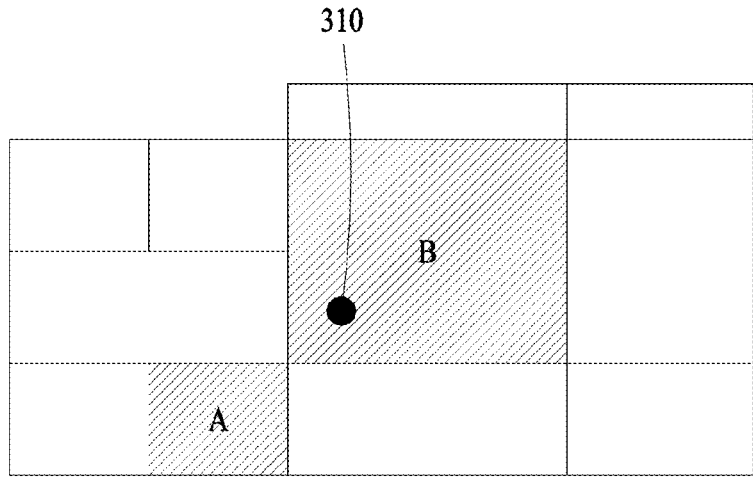
FIG. 5 is a diagram illustrating a determination of a candidate location of a device by an electronic device according to various example embodiments, by considering a labeling of each area and device information.

FIG. 5 is a diagram illustrating the electronic device (e.g., the electronic device 101 of FIG. 1) according to various example embodiments that determines the candidate location of the device by considering the information of the labeling of each area and the device (e.g., the device 400 of FIG. 3).

Referring to FIG. 5, the electronic device (e.g., the electronic device 101 of FIG. 1) according to various example embodiments may determine the candidate location by considering the labeling of a plurality of areas and the received information of the device.

For example, the electronic device may store, in a memory, information about an area in which the device is usually located or a ranking of an area in which the device is located, according to the type of device.

For example, the electronic device may receive the type of the device from the device, through the communication module. The electronic device may determine the ranking of an area in which the device is usually located or an area in which the device is located according to the type of the received device, and may store the ranking in the memory. The electronic device may determine the candidate location of the device by using information about the area in which the device is usually located or the ranking of the area in which the device is located.

In an example, the electronic device may receive the device type through the IoT platform, determine the ranking of the area in which the device is usually located or the area in which the device is located according to the type of the received device. The electronic device may store at least one of the device type, the ranking of an area in which the device is usually located or an area in which the device is located according to the type of the received device, or combination thereof in the memory.

For example, in FIG. 5, areas A and B are areas labeled as the hallway and the living room, respectively, and the type of the device may be a TV. The electronic device may store, in the memory, information about an area in which the TV is usually located or the ranking of the area in which the TV is located. For example, an area in which the TV is usually located may be an area labeled as a living room or a master bedroom, according to the type of the device. For example, the ranking of the area in which the TV is located may be in the order of the living room, master bedroom, kitchen, bathroom, hallway, and veranda.

In FIG. 5, the electronic device may determine the candidate location of the device by using the labeling of the area and the type of the device. For example, if the candidate locations of the device, according to the strength of the signal received from the location 310 of the electronic device and the device, are A and B, the electronic device may determine the area B, which is labeled as the living room, as the candidate location by considering the area in which the TV is usually located.

In FIG. 5, if the candidate locations of the device, according to the strength of the signal received from the location 310 of the electronic device and the device, are A and B, the electronic device may determine the area B, which is labeled as the living room, as the candidate location according to the ranking of the area in which the TV is usually located. For example, the electronic device may determine the candidate location of the device by assigning a weight according to a rank of an area in which the electronic device is located.

Figure 6A:
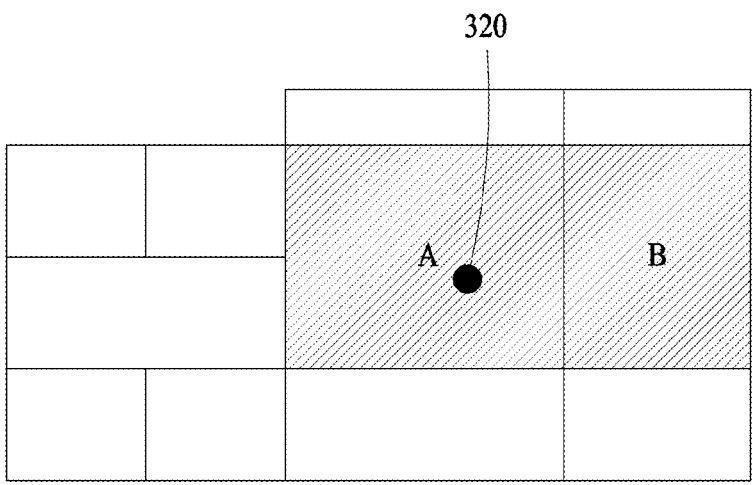
FIGS. 6A and 6B are diagrams illustrating a determination of a location of a device by an electronic device according to various example embodiments.
Figure 6B:
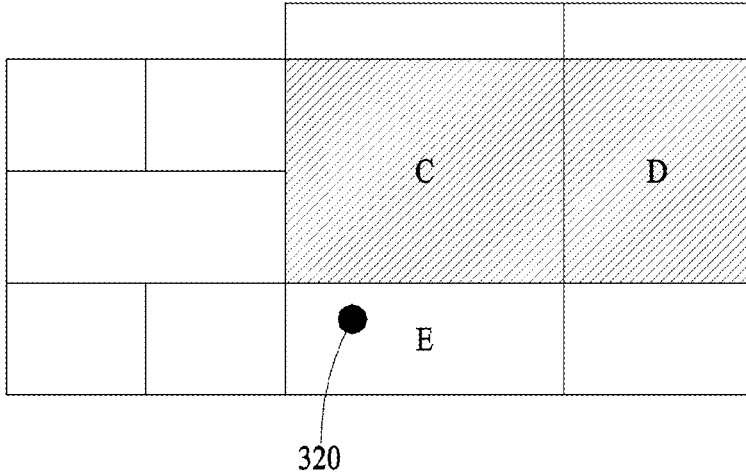

FIGS. 6A and 6B are diagrams illustrating the determination of the location of the device (e.g., the device 400 of FIG. 3) by the electronic device (e.g., the electronic device 101 of FIG. 1) according to various example embodiments.

In FIG. 6A, areas A and B indicate the candidate location determined by the electronic device using the signal received from the device. In FIG. 6A, a location 320 of the electronic device indicates the location of the electronic device at the time when the offline control history of the device is generated. The electronic device may determine the area A corresponding to the area of the location 320 of the electronic device of the time when the offline control history is generated, as the location of the device, among the plurality of candidate locations.

In FIG. 6B, the location 320 of the electronic device at the time when the offline control history is generated where an area E does not match among areas C and D, is determined as the candidate area. For example, if an area corresponding to the location 320 of the electronic device of the time when the offline control history is generated does not match the candidate location, the electronic device may use the signal received from the device to determine the candidate location of the new device, and may determine the location of the device by comparing the candidate location with the location 320 of the electronic device of the time when the offline control history is generated. As another example, the electronic device may determine the area C, which is close to the location 320 of the electronic device at the time when the offline control history is generated, as the location of the device, among the areas C and D.

Figure 7A:
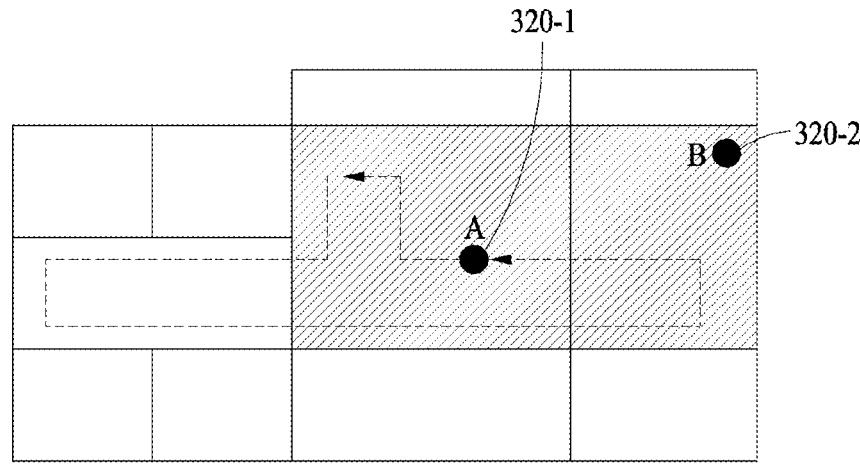
FIGS. 7A and 7B are diagrams illustrating a determination of a location of a device by an electronic device according to various example embodiments, using information of a movement path of the electronic device and/or a state of the electronic device.
Figure 7B:
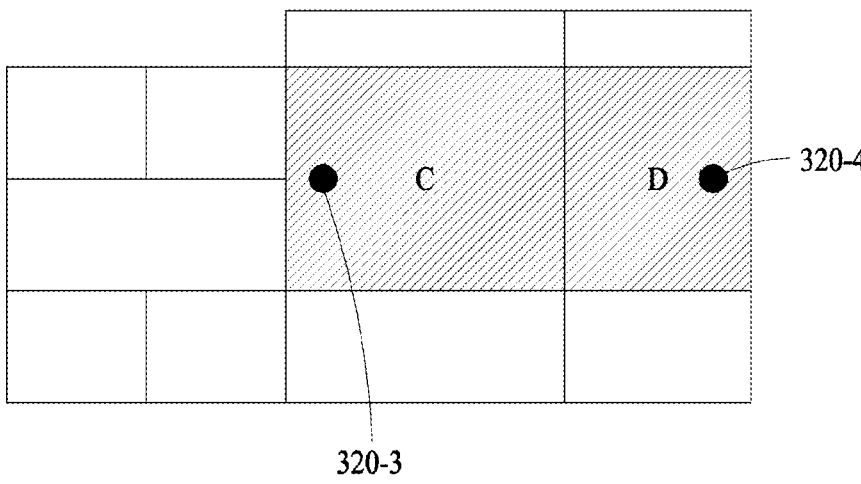

FIGS. 7A and 7B are diagrams illustrating the determination of the location of the device (e.g., the device 400 of FIG. 3) by the electronic device (e.g., the electronic device 101 of FIG. 1) according to various example embodiments, by using the movement path of the electronic device and/or the information of the state of the device. In FIGS. 7A and 7B, locations 320-1, 320-2, 320-3, and 320-4 of the electronic device correspond to locations of the electronic device at different times when offline control histories of the device were generated, and areas A, B, C, and D may indicate the candidate location of the device determined by the electronic device.

Referring to FIGS. 7A and 7B, the electronic device according to various example embodiments may determine the location of the device by considering the movement path of the electronic device and/or information of the state of the electronic device of the time when offline control history is generated.

For example, the movement path of the device may include the movement path of the electronic device before and/or after a time set based on the time when the offline control history is generated.

For example, the information of the state of the electronic device may refer to information about the use of the electronic device, such as its charging state, use state, and lock state. For example, the charging state may refer to a state in which the battery of the electronic device (e.g., the battery 189 of FIG. 1) is charged, and the use state may refer to a state in which the user is using the electronic device, such as a screen displayed on the display module (e.g., the display module 160 of FIG. 1) of the electronic device, or an output of a sound from a sound output module (e.g., the sound output module 155 of FIG. 1). For example, the locked state may refer to a state in which the power of the electronic device is turned on but not in direct use by the user, and the screen is not output by the display module or a lock standby screen is output by the display module. Each "module" herein may comprise circuitry.

FIG. 7A is a diagram illustrating the determination of the location of the device by the electronic device according to various example embodiments, by considering the movement path of the electronic device.

For example, the electronic device may determine the location of the device by considering the movement path of the electronic device of the time when the offline control history of the device is generated. In FIG. 7A, the location 320-1 of the electronic device changes before and after the time when the offline control history of the device is generated, whereas the location 320-2 of the electronic device is fixed before and after the time when the offline control history of the device is generated. The electronic device may determine area A, where the location 320-1 of the electronic device matches the candidate location, as the location of the device.

When the location of the electronic device changes before and after the offline control history of the device is generated, the probability of the user having the electronic device is higher than when the location of the electronic device is fixed, and the probability of the location of the electronic device corresponding to the actual location of the device may be higher. Referring to FIG. 7A, the electronic device may determine the location of the device as area A, where the location 320-1 of the electronic device, which changes before and after the time when the offline control history is generated, matches the candidate location, among areas A and B where the locations 320-1 and 320-2 of the electronic device and the candidate location match, by considering the movement path of the electronic device.

FIG. 7B is a diagram illustrating the determination of the location of the device by the electronic device according to various example embodiments, by considering the information of the state of the electronic device. In FIG. 7B, the electronic device may be in a use state at the time when the offline control history of the location 320-3 of the electronic device is generated, and the electronic device may be in a charging state at the time when the offline control history of the location 320-3 of the electronic device is generated.

For example, the electronic device may determine the location of the device by considering the information of the state of the electronic device of time when the offline control history of the device is generated. In FIG. 7B, the electronic device is in a use state at the location 320-3 of the electronic device, and the electronic device is in a charging state at the location 320-4 of the electronic device. The electronic device may determine the area C, where the location 320-3 of the electronic device matches the candidate location, as the location of the device.

When the electronic device is in use at the time of the offline control history of the device, the probability of the user possessing the electronic device is higher than when the electronic device is in the charging state, and the probability of the location of the electronic device corresponding to the actual location of the device may be high. In FIG. 7B, the electronic device may determine the location of the device as area C, where the location 320-3 of the electronic device, where the electronic device is in the use state when the offline control history is generated, matches the candidate location, among areas C and D where the locations 320-3 and 320-4 of the electronic device and the candidate location match, by considering the information of the state of the electronic device.

For example, when the electronic device is in a lock state at the locations 320-3 and 320-4 of the electronic device, the electronic device may determine the location of the device by considering the movement path of the electronic device illustrated in FIG. 7A.

FIGS. 8A and 8B are diagrams illustrating the determination of the candidate location of the device (e.g., the device 400 of FIG. 3) and the location of the device by the electronic device (e.g., the electronic device 101 of FIG. 1) according to various example embodiments. The area shown in FIGS. 8A and 8B may be a subdivided area of an area among the plurality of areas shown in FIGS. 4 to 7. For example, the area shown in FIGS. 8A and 8B may correspond to a subdivided area of area B among the plurality of areas shown in FIGS. 4A to 4C.

Referring to FIGS. 8A and 8B, an electronic device according to various example embodiments may determine a candidate location of the device and its location in the subdivided area.

The area shown in FIGS. 8A and 8B may correspond to an area which is a space recognized and imaged by the electronic device according to various example embodiments, using technology for spatial recognition; for example, a fingerprinting method using an RF signal, a surveillance method using an external camera and/or a motion sensor, and SLAM and VIO using the camera of the electronic device. As another example, the area illustrated in FIGS. 8A and 8B may correspond to an area imaged using image information about a space input to the electronic device.

Referring to FIG. 8A, the electronic device may determine areas corresponding to the distance value obtained by converting the strength of a signal received from the device as the candidate location of the device, based on the location 310 of the electronic device.

Referring to FIG. 8B, the electronic device may determine an area where a plurality of candidate locations match the location 320 of the electronic device of the time when the offline control history of the device is generated, as the location of the device.

As shown in FIGS. 2 to 7B, the electronic device may determine not only the location of the device among a plurality of areas, but also determine the location of the device among the subdivided areas as shown in FIGS. 8A and 8B.

The electronic device 101 according to various example embodiments may include a processor 120, a communication module 190 (including communication circuitry) which may communicate with a device 400 registered in a memory 130, and the memory 130, which is electronically connected (directly or indirectly) to the processor 120 and stores the device 400 and an instruction executed by the processor 120; and the processor 120, when the instruction is executed/operated may identify the location of the electronic device 101 in a plurality of areas where the device 400 may be located. The processor 120 may determine the candidate location of the device 400 in the plurality of areas based on a signal received from the device 400 and the location of the electronic device 101. The processor 120 may collect the control history of the device 400 using the communication module 190. The processor 120 may determine the location of the device 400 among the candidate locations based on the control history and the location of the electronic device 101. Each "processor" herein comprises processing circuitry.

The processor 120, may determine the candidate location as an area close to the location of the electronic device 101 among the plurality of areas as the strength of the signal increases, using the strength of the signal.

The processor 120, may determine the candidate location as an area of the location of the electronic device 101 among the plurality of areas if the strength of the signal is within the set range, using the strength of the signal.

The plurality of areas are areas labeled according to the purpose of the areas, and the processor 120, may determine the candidate location by considering the received information of the device 400 by using the labeling of the plurality of areas and the communication module 190.

The processor 120, may identify an offline control history in which a control signal is directly input to the device 400 from the control history of the device 400. The processor 120 may determine the location of the device 400 by comparing the location of the electronic device 101 of the time when the offline control history is generated and the candidate location. The m processor 120, may determine the location of the device 400 by considering the movement path of the electronic device 101 and the information of the state of the electronic device 101 at the time when the offline control history is generated.

The processor 120, may periodically collect the signal transmitted from the device 400.

The electronic device 101 according to various example embodiments may include a processor 120, a communication module 190 (including communication circuitry) which may communicate with a device 400 registered in a memory 130, and the memory 130, which is electronically connected (directly or indirectly) to the processor 120 and stores the device 400 and an instruction executed by the processor 120; and the processor 120, when the instruction is operated, may identify the location of the electronic device 101 in a plurality of areas where the device 400 may be located. The processor 120 may determine the candidate location of the device 400 in the plurality of areas based on a signal received from the device 400 and the location of the electronic device 101. The processor 120 may collect the control history of the device 400 using the communication module 190. The processor 120 may identify an offline control history wherein the control signal is directly input to the device 400, from the control history of the device 400. The processor 120 may determine the location of the device 400 by comparing the location of the electronic device 101 of the time when the offline control history is generated and the candidate location.

The processor 120, may determine the candidate location as an area close to the location of the electronic device 101 among the plurality of areas as the strength of the signal increases, using the strength of the signal.

The processor 120, may determine the candidate location as an area of the location of the electronic device 101 among the plurality of areas if the strength of the signal is within the set range, using the strength of the signal.

The plurality of areas are areas labeled according to the purpose of the areas, and the processor 120, may determine the candidate location by considering the received information of the device 400 by using the labeling of the plurality of areas and the communication module 190.

A method of determining locations of the device 400 according to various example embodiments may include identifying a location of the electronic device 101 in a plurality of areas where the device 400 may be stored in the memory 130 may be located, collecting a signal transmitted from the device 400 to the electronic device 101, determining candidate locations of the device 400 in the plurality of areas based on the location of the electronic device 101 and the signal, and determining the location of the device 400 from the candidate locations based on the control history and the location of the electronic device 101, and by collecting the control history of the device 400. "Based on" as used herein covers based at least on.

The operation of determining the candidate location of the device 400 may determine the candidate location as an area closer to the location of the electronic device 101 as the strength of the signal increases, among the plurality of areas by using the strength of the signal.

The operation of determining the candidate location of the device 400 determines the candidate location as the location of the electronic device 101 among the plurality of areas if the strength of the signal is within a set range, using the strength of the signal.

The plurality of areas are areas labeled according to the purpose of the area, and the operation of determining the candidate location of the device 400 determines the candidate location by considering the information of the labelled and received information of the device 400 of the plurality of areas.

The operation of determining the location of the device 400 may determine the location of the device 400 by identifying an offline control history in which a control signal is directly input to the device 400 from the control history of the device 400, and by comparing the location of the electronic device 101 of the time when the offline control history is generated with the candidate location.

The operation of determining the location of the device 400 may determine the location of the device 400 by considering the movement path and information of the state of the electronic device 101 at the time when the offline control history is generated.

The operation of collecting the signal may periodically collect the signal transmitted from the device 400.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one processor comprising processing circuitry;

a communication module, comprising communication circuitry, configured to communicate with an external device registered in a memory of the electronic device, wherein the external device is physically separate from the electronic device; and the memory storing instructions which, when executed individually and/or collectively by the at least one processor, controls the electronic device to:

identify a location of the electronic device in a plurality of areas where the external device may be located, determine a candidate location of the external device in the plurality of areas based on a signal received from the external device and a location of the electronic device, obtain a control history of the external device via the communication module, wherein the control history of the external device includes information related to an offline history and an online history, wherein the information related to the offline history is based on records when a control signal is input directly to the external device, and wherein the information related to the online history is based on records when a control signal input by the user in an apparatus other than the external device is transmitted to the external device via the communication module, and determine a location of the external device among the candidate locations based on the control history and the location of the electronic device.

2. The electronic device of claim 1, wherein the memory stores instructions which, when executed individually and/or collectively by the at least one processor, controls the electronic device to determine the candidate location as an area close to the location of the external device among the plurality of areas, using the strength of the signal, as the strength of the signal becomes stronger.

3. The electronic device of claim 1, wherein the memory stores instructions which, when executed individually and/or collectively by the at least one processor, controls the electronic device to determine the candidate location as an area of the location of the electronic device among the plurality of areas, using the strength of the signal, when the strength of the signal is within a set range.

4. The electronic device of claim 1, wherein the plurality of areas are areas labeled according to a purpose of the area; and the memory stores instructions which, when executed individually and/or collectively by the at least one processor, controls the electronic device to determine the candidate location at least by considering the labeling of the plurality of areas and the information of the external device received at least by using the communication module.

5. The electronic device of claim 1, wherein the memory stores instructions which, when executed individually and/or collectively by the at least one processor, controls the electronic device to:

determine the location of the external device at least by comparing a location of the electronic device at a time when the offline control history is generated and the candidate location.

6. The electronic device of claim 5, wherein the memory stores instructions which, when executed individually and/or collectively by the at least one processor, controls the electronic device to determine a location of the external device at least by considering a movement path of the electronic device and the state information of the electronic device when the offline control history is generated.

7. The method of determining the location of the external device of claim 1, wherein the memory stores instructions which, when executed individually and/or collectively by the at least one processor, controls the electronic device to periodically collect the signal transmitted from the external device.

8. A method of determining a location of a device, the method comprising:

identifying a location of an electronic device in a plurality of areas where an external device registered in a memory may be located, wherein the external device is physically separate from the electronic device;

collecting a signal transmitted from the external device to the electronic device;

determining a candidate location of the external device in the plurality of areas based on the location of the electronic device and the signal;

obtaining a control history of the external device, wherein the control history of the external device includes information related to an offline history and an online history, wherein the information related to the offline history is based on records when a control signal is input directly to the external device, and wherein the information related to the online history is based on records when a control signal input by the user in an apparatus other than the external device is transmitted to the external device via the communication module, and determining the location of the external device from the candidate location based on the control history and the location of the electronic device.

9. The method of claim 8, wherein the determining of the candidate location of the external device comprises determining the candidate location as an area close to the location of the electronic device among the plurality of areas, as a strength of the signal becomes stronger.

10. The method of claim 8, wherein the determining of the candidate location of the external device comprises determining the candidate location as an area of the location of the electronic device among the plurality of areas, when the strength of the signal is within a set range.

11. The method of claim 8, wherein:

the plurality of areas is an area labeled according to a purpose of the area; and determining the candidate location of the external device determines the candidate location at least by considering the labeling of the plurality of areas and the received information of the external device.

12. The method of claim 8, wherein the determining of the location of the external device comprises determining the location of the external device by comparing the location of the electronic device at a time when an offline control history is generated and the candidate location.

13. The method of claim 12, wherein determining of the location of the external device comprises determining the location of the external device at least by considering a movement path of the electronic device and the information of the state of the electronic device at a time when the offline control history is generated.

14. The method of claim 8, wherein the collecting of the signal periodically comprises collecting the signal transmitted from the external device.

* * * * *